(12) United States Patent
Weiglhofer et al.

(10) Patent No.: US 6,492,754 B1
(45) Date of Patent: Dec. 10, 2002

(54) MAGNET RETENTION CHANNEL ARRANGEMENT FOR HIGH SPEED OPERATION

(75) Inventors: John Weiglhofer, Lyme; Stewart Peil, Norwich, both of CT (US)

(73) Assignee: Electric Boat Corporation, Groton, CT (US)

( * ) Notice: Subject to any disclaimer, the term of this patent is extended or adjusted under 35 U.S.C. 154(b) by 0 days.

(21) Appl. No.: 09/998,973

(22) Filed: Oct. 31, 2001

(51) Int. Cl.⁷ ............................................. H02K 21/12
(52) U.S. Cl. .................. 310/156.08; 310/261; 310/262
(58) Field of Search ....................... 310/156.01–156.84, 310/261, 262

(56) References Cited

U.S. PATENT DOCUMENTS

| | | |
|---|---|---|
| 2,655,611 A | 10/1953 | Sherman |
| 3,508,095 A | 4/1970 | Knudson et al. |
| 3,762,042 A | 10/1973 | Abe et al. |
| 4,100,392 A | 7/1978 | Dron et al. |
| 4,316,923 A | 2/1982 | Monforte et al. |
| 4,336,649 A | 6/1982 | Glaser |
| 4,663,551 A | 5/1987 | Weh et al. |
| 4,724,348 A * | 2/1988 | Stokes ........................ 310/152 |
| 4,769,624 A | 9/1988 | Merritt et al. |
| 4,792,712 A | 12/1988 | Stokes |
| 4,859,891 A | 8/1989 | Jenkins et al. |
| 5,191,255 A | 3/1993 | Kloosterhouse et al. |
| 5,200,662 A | 4/1993 | Tagami et al. |
| 5,811,908 A * | 9/1998 | Iwata et al. ............ 310/156.08 |
| 5,894,183 A | 4/1999 | Borchert |
| 5,973,435 A * | 10/1999 | Irie et al. ...................... 310/261 |
| 6,013,968 A | 1/2000 | Lechner et al. |
| 6,510,746 * | 11/2000 | Lechner ...................... 310/181 |
| 6,376,956 B1 * | 4/2002 | Hosoya .................. 310/154.17 |

OTHER PUBLICATIONS

Pending U.S. patent application Ser. No. 10/002,785, Pieter Van Dine et al., Magnet Retention Arrangement for High Speed Rotors, filed Nov. 2, 2001.

Pending U.S. patent application Ser. No. 10/002,786, Pieter Van Dine et al., Permanent Magnet Retaining Arrangement for High Speed Rotors, filed Nov. 2, 2001.

* cited by examiner

Primary Examiner—Nestor Ramirez
Assistant Examiner—Nguyen Hanh
(74) Attorney, Agent, or Firm—Baker Botts, LLP

(57) ABSTRACT

In the magnet retention channel arrangement for a high speed rotor described in the specification, a rotor has an array of radially projecting, angularly spaced pole pieces and a magnet retention channel arrangement inserted between each adjacent pair of pole pieces. Each magnet retention channel arrangement has ferromagnetic side walls and a nonmagnetic alloy cap and nonmagnetic alloy dovetail feet affixed to opposite edges of the ferromagnetic side walls by welding or by a hot isostatic pressed powder metallurgy technique. The channels contain permanent magnets and the ferromagnetic side walls couple the flux from the magnets to the pole pieces with substantially no magnetic discontinuities and the nonmagnetic alloy cap and nonmagnetic core avoids magnetic shorting.

11 Claims, 2 Drawing Sheets

MAGNET RETENTION CHANNEL ARRANGEMENT FOR HIGH SPEED OPERATION

BACKGROUND OF THE INVENTION

This invention relates to arrangements for holding magnets on components such as rotors of electrical machines that rotate at high speed.

In conventional permanent magnet electrical machines, magnets are radially retained on a rotor by nonmagnetic caps which are keyed into adjacent pole pieces or by providing angled sides on the magnet which are radially retained by wedged-shaped adjacent laminated pole pieces. Such arrangements, however, do not provide sufficient strength to hold a magnet securely in position when subjected to the radial accelerations encountered in high speed machines. In such arrangements, moreover, the pole pieces are subjected to increased stress as a result of the added radial load of the magnet during high speed operation. Furthermore, when angled sides of a magnet are engaged by wedged-shaped adjacent pole pieces, the radial location of the magnet may change, causing imbalance in the rotor. Also, such magnet support arrangements introduce flux path discontinuities in the dovetails and oblique surfaces of the magnetic components which decreases the efficiency of the machine.

The Iwata U.S. Pat. No. 5,811,908 discloses U-shaped permanent magnet retention channels in which the outer ends of the channel walls have projections to be received in corresponding grooves in adjacent pole pieces and the entire channel is made of a single piece of magnetic material. In the patent to Irie et al. U.S. Pat. No. 5,973,435 permanent magnets are assembled within protective nonmagnetic holders having nonmagnetic metal facings with projections by which they are secured to a non magnetic connecting band. The Kloosterhouse et al. U.S. Pat. No. 5,191,255 shows a permanent magnet mounted in a U-shaped channel having laterally projecting tabs which receive screws for affixing the channel to a rotor.

SUMMARY OF THE INVENTION

Accordingly, it is an object of the present invention to provide a magnet retention arrangement for high speed electric machine components which overcomes disadvantages of the prior art.

Another object of the invention is to provide a magnet retention arrangement for high speed machines by which a magnet is securely retained in a rotor operating at high speed without introducing flux path discontinuities.

These and other objects of the invention are attained by providing a bimetallic U-shaped channel which has side walls made of ferromagnetic material to transmit magnetic flux from a magnet within the channel to an adjacent pole piece and a nonmagnetic alloy cap bonded to one edge of each side wall. The side walls of the channel are preferably bonded to the nonmagnetic cap by welding or hot isostatic pressed powder metallurgy techniques and nonmagnetic alloy feet are similarly joined to the opposite edges of the channel walls to secure the channel to the rotor and avoid magnetic shorting and discontinuities. Preferably, the nonmagnetic feet have lateral projections received in corresponding grooves in a nonmagnetic core. One or more permanent magnets are inserted into the magnet retention channel and the assembly is then slidably inserted in the corresponding grooves in the nonmagnetic core. By providing a channel arrangement utilizing such combined magnetic and nonmagnetic channel elements having high strength joints between magnetic and nonmagnetic materials, magnetic flux path discontinuities can be avoided while maximizing magnet retention strength of the channel.

DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
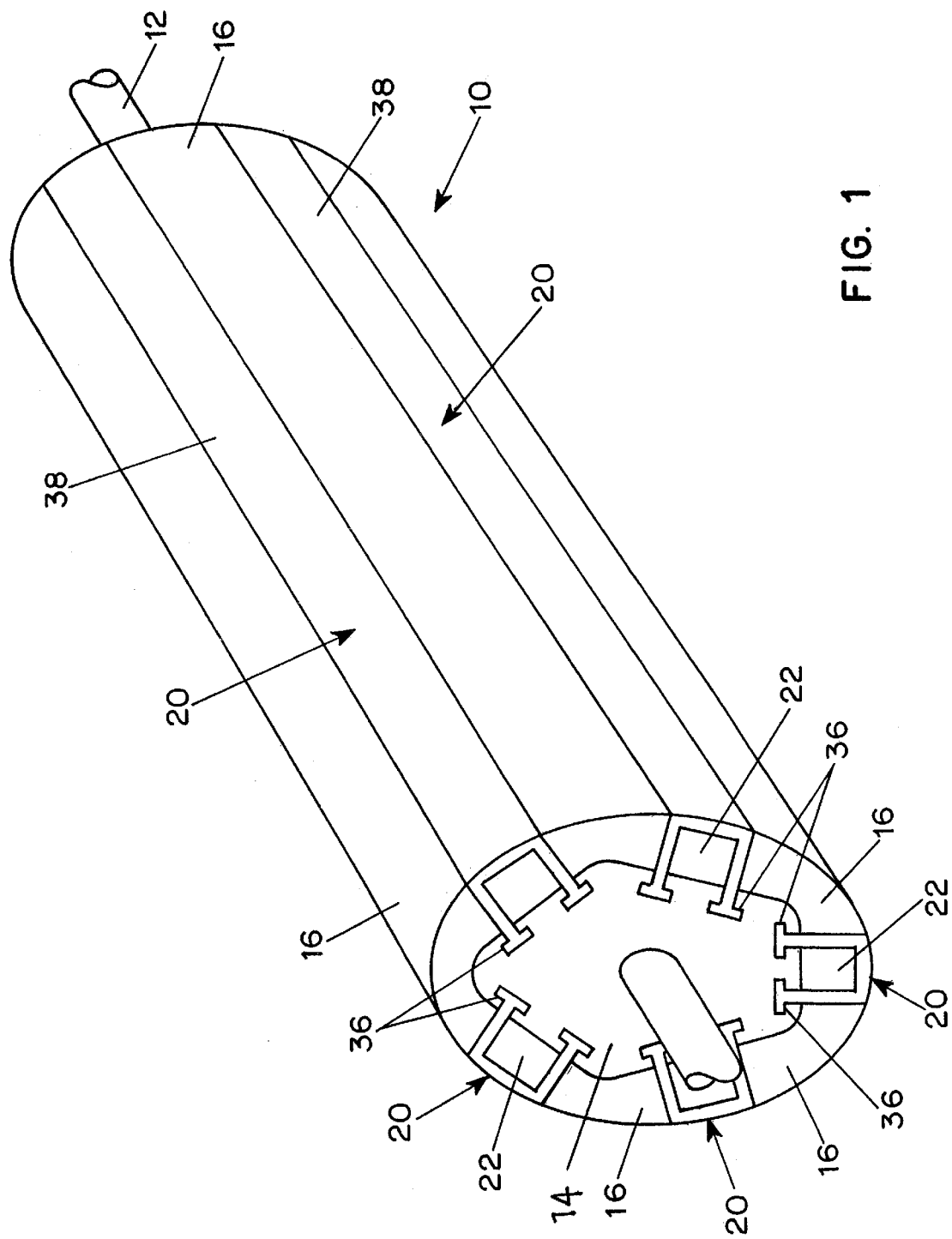
FIG. 1 is a perspective schematic view showing a representative embodiment of a rotor for high speed machine having magnet retention channels arranged in accordance with the invention.

The typical embodiment of a high speed component for an electrical machine shown in FIG. 1 is in the form of a rotor 10 having a shaft 12 carrying a nonmagnetic core 14, and having radially projecting ferromagnetic pole pieces 16 made, for example, from laminated sheets of ferromagnetic material, angularly distributed around the periphery of the rotor. In order to retain permanent magnets in position between the pole pieces without introducing dovetails or other discontinuities in the flux path, a magnet retention channel arrangement 20 containing one or more permanent magnets 22 is mounted in the space between each adjacent pair of pole pieces 16.

Figure 2:
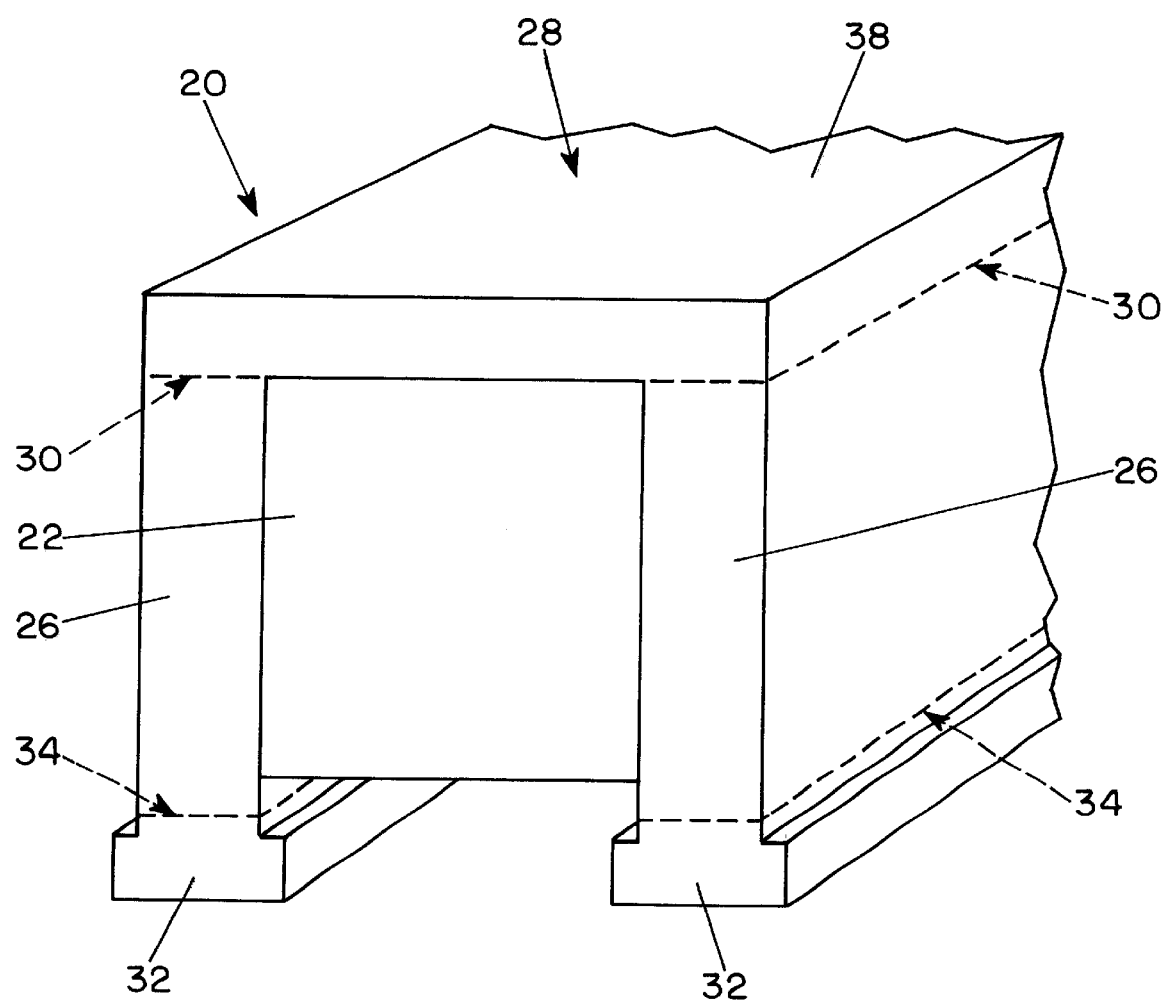
FIG. 2 is a perspective schematic view illustrating the typical magnet retention channel arrangement provided in the embodiment illustrated in FIG. 1.

As best seen in FIG. 2, the magnet retention channel arrangement 20 has two spaced parallel ferromagnetic side walls 26 joined at their radially outer edges to a nonmagnetic alloy cap 28 along an interface plane 30. The opposite radially inner edges of the side walls 26 have nonmagnetic alloy feet 32 joined to them along interface planes 34. Preferably, the feet 32 have a dovetail to be received in corresponding grooves 36 in the nonmagnetic core 14 which are located away from the flux path through the ferromagnetic side walls 26 between the magnet 22 and the adjacent ferromagnetic pole pieces 16, thereby avoiding any discontinuity in the flux path between each magnet and the adjacent pole pieces. If desired, the outer face 38 of the nonmagnetic alloy cap 28 may have a curvature corresponding to the curvature of the periphery of the rotor 10 as shown in FIG. 1.

In a preferred embodiment, to avoid magnetic shorting and flux path discontinuities, the side walls 26 of the channel arrangement are made of a magnetic steel alloy which has magnetic properties similar to those of the adjacent pole pieces 16 and the cap 28 and feet 32 are made of nonmagnetic alloy steel.

The bimetallic U-shaped channel 20 is preferably made by welding the side walls 26 to the cap 28 and to the feet 32 along the interface planes 26 and 34, respectively, or by hot isostatic pressed powder metallurgy techniques similar to those used to form jet turbine rotors. Hot isostatic pressing techniques provide strong joints between the two different metals which are capable of withstanding the high centrifugal forces applied to them during high speed operation of the rotor 10. If the cap and feet are welded to the side walls, the weld joints must be of sufficient strength to retain the magnet at high speeds. This can be accomplished, for example, by electron beam welding or by providing a filler metal of sufficient strength between the components.

By combining magnetic and nonmagnetic channel components in the described manner, magnetic flux path discontinuities and magnetic shorting are substantially eliminated while maximizing magnet retention strength.

Although the invention has been described herein with reference to specific embodiments, many modifications and variations therein will readily occur to those skilled in the art. Accordingly, all such variations and modifications are included within the intended scope of the invention.

We claim:

1. A magnet retention channel arrangement comprising:

a pair of spaced, parallel ferromagnetic side walls;

a nonmagnetic alloy cap bonded to a first edge of each of the ferromagnetic side walls; and a pair of nonmagnetic alloy feet each bonded to a second, opposed edge of the two ferromagnetic side walls, respectively.

2. A magnet retention channel arrangement according to claim 1 wherein the nonmagnetic alloy cap and the nonmagnetic alloy feet are bonded to the ferromagnetic side walls by a hot isostatic pressed powder metallurgy technique.

3. A magnet retention channel arrangement according to claim 1 wherein the nonmagnetic alloy cap and the nonmagnetic alloy feet are bonded to the ferromagnetic side walls by welding.

4. A magnet retention channel arrangement according to claim 3 wherein the nonmagnetic alloy cap and the nonmagnetic alloy feet are bonded to the edges of the ferromagnetic side walls by electron beam welding.

5. A magnet retention channel arrangement according to claim 1 including at least one permanent magnet contained in the space between the ferromagnetic side walls.

6. A high speed rotor comprising:

a central shaft;

a nonmagnetic core;

a plurality of radially projecting, angularly spaced pole pieces made of ferromagnetic material and supported from the core; and a plurality of magnet retention channel arrangements:

each channel arrangement being mounted between an adjacent pair of pole pieces and including:

a pair of spaced ferromagnetic side walls adjacent to the pole pieces;

a nonmagnetic alloy cap bonded to radially outer edges of the ferromagnetic side walls and a pair of nonmagnetic alloy feet bonded to radially inner edges of the ferromagnetic side walls and supported from the nonmagnetic core; and at least one permanent magnet disposed in the space between the ferromagnetic side walls so that the ferromagnetic side walls provide flux paths between the magnet and the adjacent pole pieces having substantially no magnetic discontinuities and the nonmagnetic alloy cap inhibits magnetic shorting.

7. A high speed rotor arrangement according to claim 6 wherein the nonmagnetic alloy feet have dovetail projections received in corresponding recesses in a nonmagnetic core member affixed to the rotor shaft at a location outside the path of magnetic flux from the permanent magnet to the adjacent pole pieces.

8. A high speed rotor arrangement according to claim 7 wherein the ferromagnetic side walls are bonded to the nonmagnetic alloy cap and to the nonmagnetic alloy feet by a hot isostatic pressed powder metallurgy technique.

9. A high speed rotor arrangement according to claim 7 wherein ferromagnetic side walls are bonded to the nonmagnetic alloy cap and to the nonmagnetic alloy feet by welding.

10. A high speed rotor arrangement according to claim 9 wherein the ferromagnetic side walls are bonded to the nonmagnetic alloy cap and to the nonmagnetic alloy feet by electron beam welding.

11. A high speed rotor arrangement according to claim 6 wherein the ferromagnetic side walls of the channel arrangement have magnetic characteristics compatible to those of the adjacent pole pieces.

* * * * *